US012141679B2

(12) United States Patent
Abdulla et al.

(10) Patent No.: US 12,141,679 B2
(45) Date of Patent: Nov. 12, 2024

(54) MAPPABLE FILTER FOR NEURAL PROCESSOR CIRCUIT

(71) Applicant: Apple Inc., Cupertino, CA (US)

(72) Inventors: Waleed Abdulla, Sunnyvale, CA (US); Paolo Di Febbo, Redwood City, CA (US); Mohammad Ghasemzadeh, San Jose, CA (US); Yohan Rajan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 980 days.

(21) Appl. No.: 17/065,428

(22) Filed: Oct. 7, 2020

(65) Prior Publication Data

US 2022/0108155 A1 Apr. 7, 2022

(51) Int. Cl.
*G06N 3/063* (2023.01)
*G06N 3/04* (2023.01)
*G06N 3/08* (2023.01)

(52) U.S. Cl.
CPC .............. *G06N 3/063* (2013.01); *G06N 3/04* (2013.01); *G06N 3/08* (2013.01)

(58) Field of Classification Search
CPC ............ G06N 3/063; G06N 3/04; G06N 3/08
See application file for complete search history.

(56) References Cited

U.S. PATENT DOCUMENTS

| | | | |
|---|---|---|---|
| 9,779,786 B1 | 10/2017 | Wu et al. | |
| 9,805,303 B2 | 10/2017 | Ross et al. | |
| 10,380,479 B2 | 8/2019 | Chang et al. | |
| 2015/0170021 A1* | 6/2015 | Lupon | G06N 3/045 706/15 |
| 2016/0342893 A1* | 11/2016 | Ross | G06N 3/045 |
| 2017/0344876 A1* | 11/2017 | Brothers | G06N 3/082 |
| 2018/0005343 A1* | 1/2018 | Rhoads | G06T 1/0064 |
| 2018/0173571 A1* | 6/2018 | Huang | G06N 3/063 |
| 2020/0090032 A1* | 3/2020 | Croxford | G06N 3/08 |
| 2020/0159809 A1* | 5/2020 | Catthoor | G06N 3/045 |

OTHER PUBLICATIONS

Chen, Y. et al., "A Survey of Accelerator Architectures for Deep Neural Networks," Engineering, vol. 6, Iss. 3, Jan. 29, 2020, pp. 264-274.

* cited by examiner

*Primary Examiner* — Casey R. Garner

(74) *Attorney, Agent, or Firm* — Sterne, Kessler, Goldstein & Fox P.L.L.C.

(57) ABSTRACT

Embodiments relate to a neural processor circuit that may include a fetch circuit that fetches coefficient data of a machine learning model from a memory source. The neural processor circuit may also include one or more neural engine circuits that are coupled to the fetch circuit. A neural engine circuit may include a buffer circuit that stores the coefficient data. The neural engine circuit may also include a coefficient organizing circuit that generates at least a first mapping and a second mapping of the stored coefficient data according to one or more control signals. The neural engine may also include a computation circuit that receives and processes at least a portion of input data with the coefficient data as mapped according to the first mapping or process at least the portion of the input data with the coefficient data as mapped according to the second mapping.

20 Claims, 10 Drawing Sheets

MAPPABLE FILTER FOR NEURAL PROCESSOR CIRCUIT

BACKGROUND

1. Field of the Disclosure

The present disclosure relates to a circuit for performing operations related to neural networks.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

In a machine learning model, the weights and kernel values may be adjusted to particular values to recognize features in input data. However, the adjusted values used for recognizing features are often limited to detecting features in a certain configuration, such as a particular orientation of an image. If the feature is transformed or otherwise changed (e.g., when the feature is turned 90 degrees), the weights and kernel values in a trained machine learning model may fail to perform correct inference on the input data.

SUMMARY

Embodiments relate to a neural processor circuit including one or more neural engine circuits that perform computations. The neural processor circuit may include a fetch circuit that fetches coefficient data of a machine learning model from a memory source. The neural processor circuit may also include one or more neural engine circuits that are coupled to the fetch circuit. At least one of the neural engine circuits may include a buffer circuit that receives the coefficient data from the fetch circuit and stores the coefficient data. The neural engine circuit may also include a coefficient organizing circuit that generates at least a first mapping and a second mapping of the stored coefficient data according to one or more control signals. The neural engine may also include a computation circuit that receives and processes at least a portion of input data with the coefficient data as mapped according to the first mapping or process at least the portion of the input data with the coefficient data as mapped according to the second mapping.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor circuit that generates different mappings of coefficient data of a machine learning model to detect features of input data arranged in different configurations. Input data (e.g., images) for inference or prediction may have a different configuration (e.g., portrait mode or landscape mode) relative to training data used for generating coefficient data. Instead of generating new sets of coefficient data for different configuration, the neural processor circuit modifies mappings of coefficient data so that the same coefficient data can be used across input data of different configurations.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
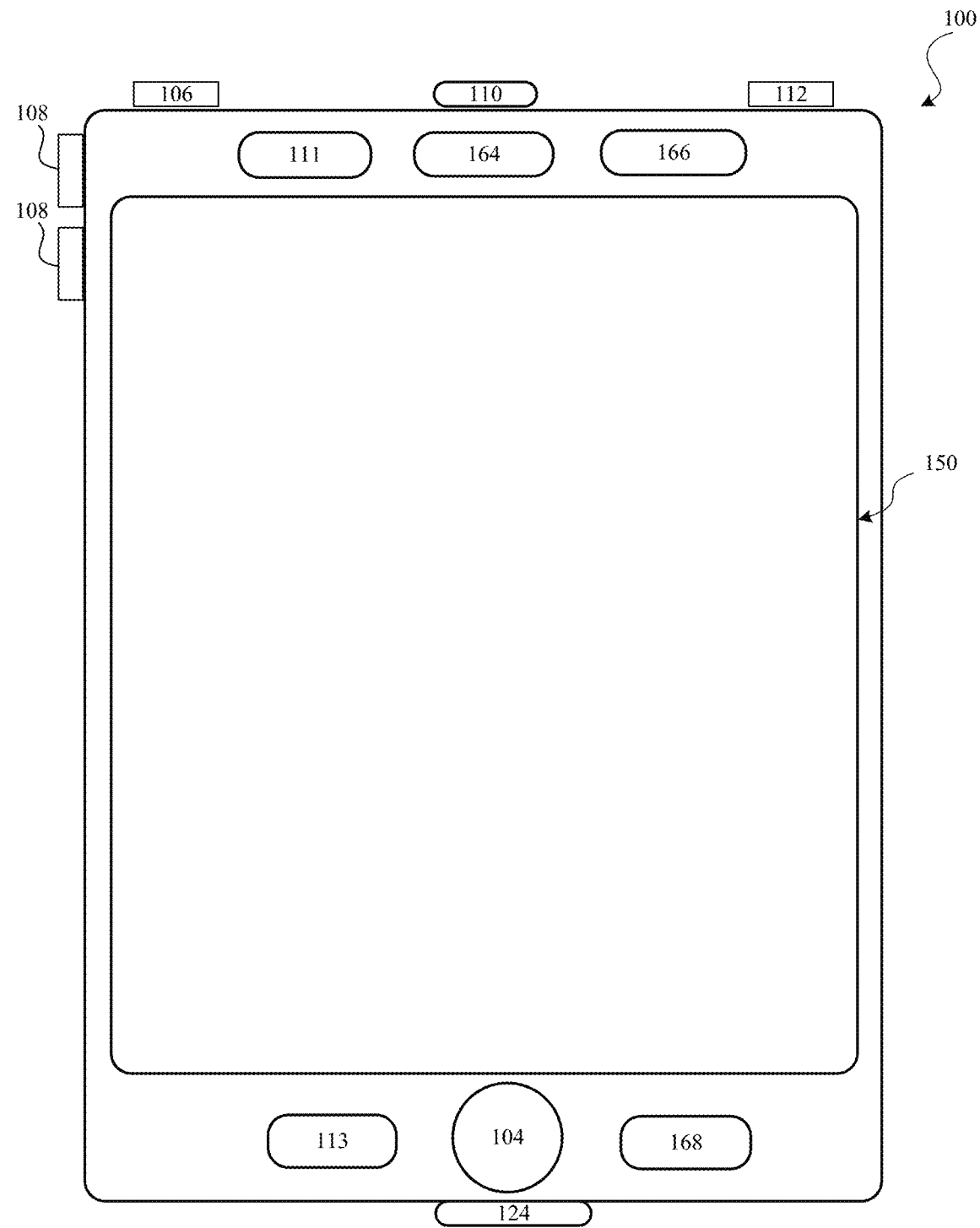
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

In some embodiments, device 100 may operate in different orientations. For example, device 100 detects the orientation that a user is holding device 100 (e.g., upright or sideways) and automatically rotates the contents displayed in touch screen 150. The software application for image sensors 164 such as the cameras may also rotate to allow users to capture images in a portrait mode and in a landscape mode. In some cases, the camera software application may also operate in rotations of 180 degrees and 270 degrees. Images generated by image sensors 164 may be in different rotations.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
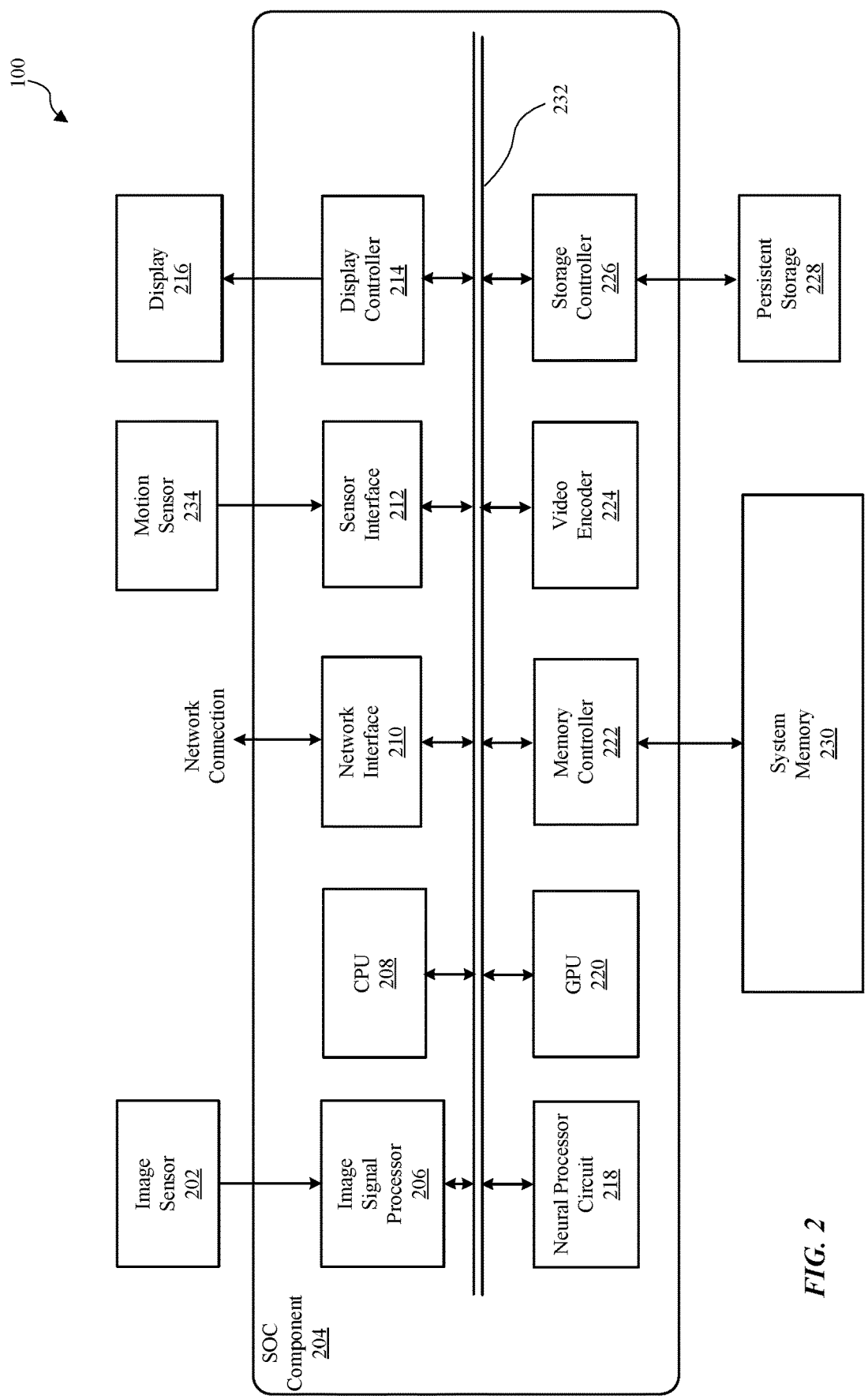
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern. Objects generated in the raw image data may be in different orientations. For example, a user may take a first image in a portrait mode, turn device 100 sideway, and take a second image in a landscape mode. The objects in the second image may appear to be turned 90 degrees compared to the first image.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model. Performing inference or prediction may sometimes be referred to as the runtime of the machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function. The values in various kernels, node weights, activation functions, and other weights in a machine learning model may be referred to as coefficient data.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
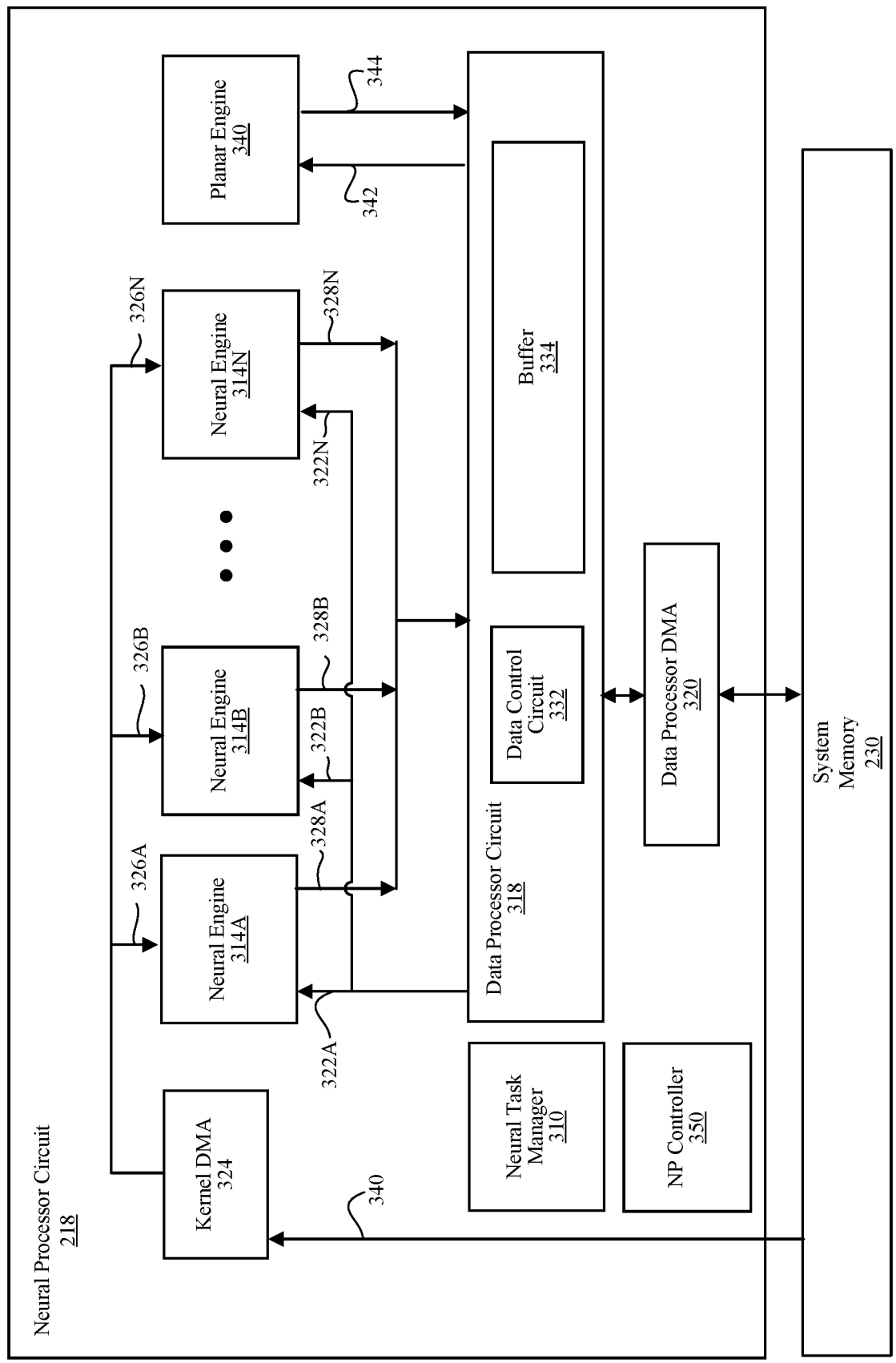
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, planar engine 340, and neural processor (NP) controller 350. Neural processor circuit 218 may include fewer components than what are illustrated in FIG. 3 or include additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. These computing operations may be referred to as I/O bound computations and are also referred to as "non-convolution operations" herein. In contrast, neural engines 314 may focus on complex computation such as convolution operations whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a data control circuit 332 and a buffer 334. Buffer 334 is temporary storage for storing data associated with operations of neural processor circuit 218, such as input data that is transmitted from system memory 230 (e.g., data from a machine learning model) and other data that is generated within neural processor circuit 218. The input data may be transmitted from system memory 230. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N (also referred to as "neural input data" herein) for feeding to corresponding neural engines 314A through 314N and input data 342 (also referred to as "planar input data" herein) for feeding to planar engine 340, as well as output data 328A through 328N from each of neural engines 314A through 314N (also referred to as "neural output data" herein) and output data 344 from planar engine 340 (also referred to as "planar output data" herein) for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as planar input data 342 to planar engine 340. Likewise, planar output data 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Data control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Data control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes. Details of data control circuit 332 are described below in detail with reference to FIG. 9.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Example Neural Engine Architecture

Figure 4:
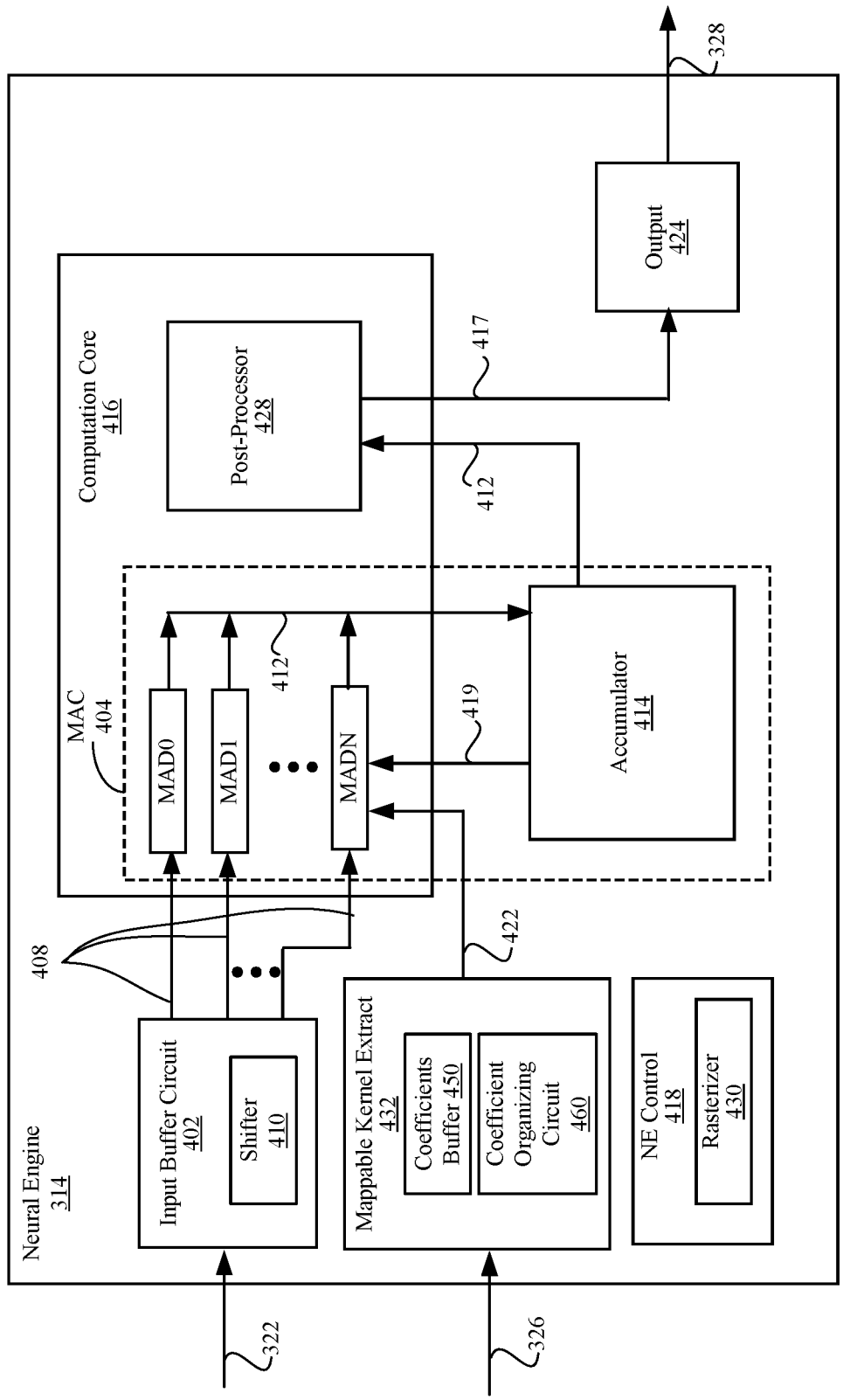
FIG. 4 is a block diagram of a neural engine in the neural processor circuit, according to one embodiment.

FIG. 4 is a block diagram of neural engine 314, according to one embodiment. Neural engine 314 is a circuit that performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, mappable kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Mappable kernel extract circuit 432 is a circuit that receives kernel data 326 and other coefficient data from kernel DMA 324 and extracts kernel coefficients 422 for processing at computation core 416. In one embodiment, mappable kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, mappable kernel extract circuit 432 receives kernel data in an uncompressed format and the kernel coefficients are determined without referencing a LUT or using a mask.

The kernel data and other coefficient data, whether reconstructed from compressed data or fetched directly from kernel DMA 324, may be saved in coefficients buffer 450, which is a circuit that has different memory addresses for storing various values. The coefficient data may be a set of values that are stored in different memory addresses. For example, a 3×3 kernel has 9 different values of coefficient data that may be stored in different memory addresses of the coefficients buffer 450. Other types of coefficient data may include other sets of values, such as weights, activation coefficients, neuron coefficients of a machine learning model. A set of coefficient data that is read in a particular order may be provided to MAC 404 as coefficients 422 for computation.

Figure 6A:
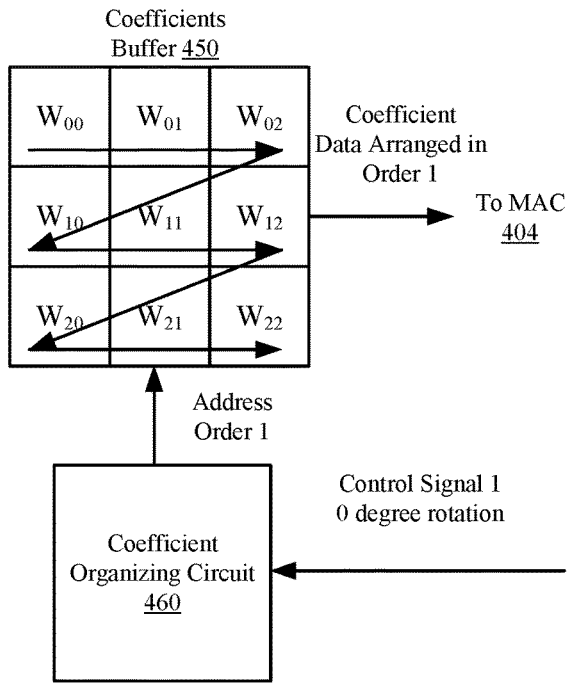
FIGS. 6A, 6B, 6C, 6D are conceptual diagrams illustrating an example operation of a mappable kernel extract, according to one embodiment.
Figure 6B:
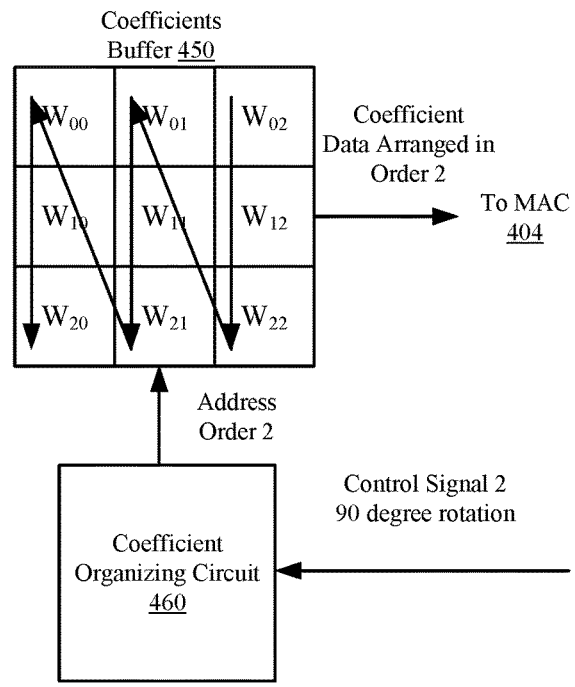
Figure 6C:
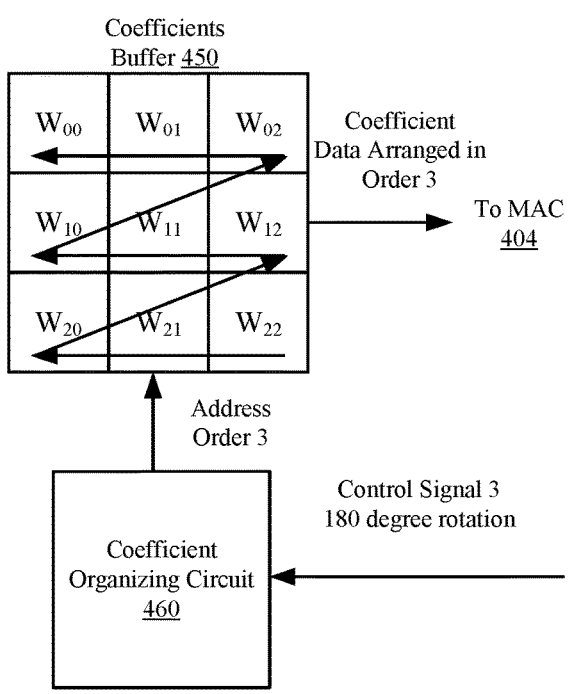
Figure 6D:
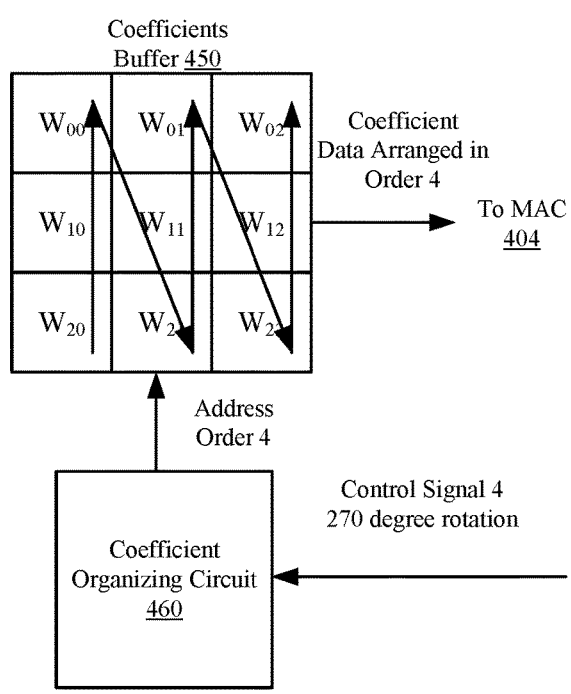

The same set of coefficient data may be generated with different mappings to the programmable register of MAD circuits in MAC 404. The mappings may serve as different input coefficients 422 to be separately provided to MAC 404 for different operating cycles. A coefficient organizing circuit 460 generates different mappings of the coefficient data by any suitable ways, such as by changing the read orders of memory addresses of the coefficients buffer 450 for a downstream computation circuit (e.g., MAC 404) to fetch the values saved in coefficients buffer 450 based on the different read orders. For example, in one case, a 3×3 kernel may be read row by row, which represents a first mapping of the kernel. In another case, the same kernel may be read column by column, which represents a second mapping of the kernel. The coefficient organizing circuit 460 may receive multiple control signals. Each control signal may correspond to a particular mapping. Based on the control signals, the coefficient organizing circuit 460 generates various read orders of the memory addresses. The same set of coefficient data may be used to generate different mappings for the computation of the MAC 404 with segments 408 of the input data. The generation of multiple mappings from a set of coefficient data reduces the size of the machine learning model because a set of values may be used to represent different kernels or other weight sets. This also speeds up the computation of the machine learning model in training and in runtime. Detailed operations and structures of the mappable kernel extract 432 and its components is described below with reference to FIG. 6A through FIG. 7.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

Computation core 416, the MAD circuits, accumulator 414, MAC 404, and post-processor 428 are examples of different computation circuits in a neural engine 314.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, data processor DMA 320, data buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine Architecture

Figure 5:
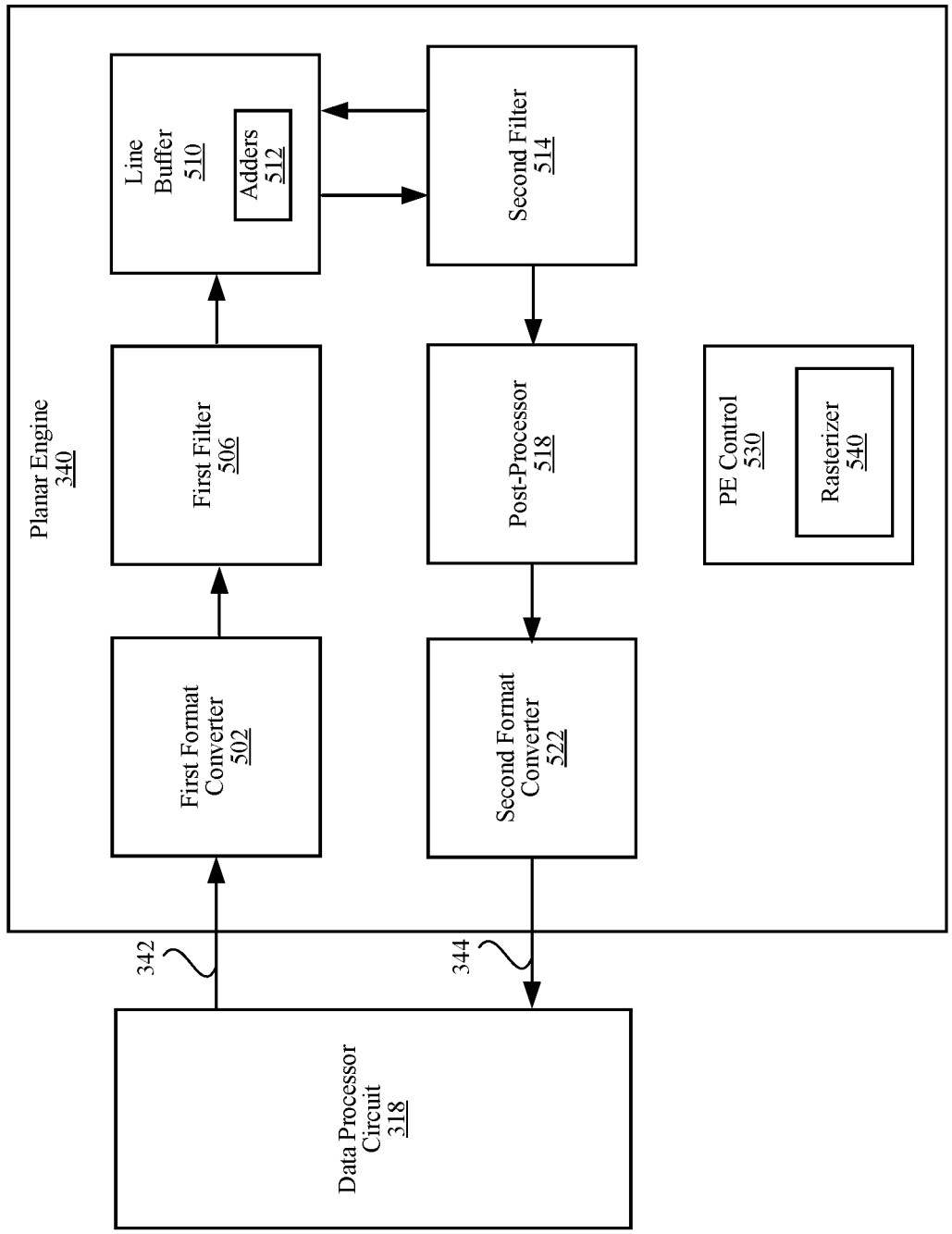
FIG. 5 is a block diagram of a planar engine in the neural processor circuit, according to one embodiment.

FIG. 5 is a block diagram of planar engine 340, according to one embodiment. Planar engine 340 is a circuit that is separated from neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes element-wise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5A. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Mapping Operation of Coefficient Data

FIGS. 6A through 6D are conceptual diagrams illustrating an example operation of mappable kernel extract 432, according to one embodiment. FIGS. 6A through 6D show four cases of operation of mappable kernel extract 432 (label 432 not shown in FIG. 6). In one embodiment, mappable kernel extract 432 includes a coefficient organizing circuit 460 and a coefficients buffer 450, which may include multiple memory addresses for storing values. For the purpose of illustration, coefficients buffer 450 in FIGS. 6A through 6D has 9 memory addresses, which are denoted as $W_{yx}$, where y may be a first digit and x may be a second digit. For the purpose of illustration, y may correspond to a row number and x may correspond to a column number, although the memory addresses and locations do not need to be really arranged as rows and columns. The particular arrangement of memory addresses in FIGS. 6A through 6D is for example only. In various embodiments, coefficients buffer 450 may include more or fewer memory addresses and the addresses do not need to be arranged in rows and columns. When a set of coefficient data (e.g., kernel data) of a machine learning model is fetched from a source (e.g., kernel DMA 324), the values are stored in the memory addresses. For example, a set of 9 values may be saved respectively in $W_{00}$, $W_{01}$, $W_{02}$, ... $W_{22}$.

The coefficient organizing circuit 460 generates different mappings of coefficient data, as shown in the four different cases in FIGS. 6A through 6D. The coefficient organizing circuit 460 receives control signals that correspond to different mappings. For example, in the first case shown in FIG. 6A, control signal 1 directs the coefficient organizing circuit 460 to generate a first mapping of a zero-degree rotation, which represents an unaltered order of reading of the coefficient data. The control signal may be generated by CPU 208 or by neural processor circuit 218 based on the compilation of instruction of a machine learning model. In response to the control signal 1, the coefficient organizing circuit 460 may generate an address order 1 that corresponds to the normal order of reading the memory addresses, such as $W_{00}$, $W_{01}$, $W_{02}$, $W_{22}$, as shown in the direction of arrows in the first case. A downstream computation circuit, such as MAC 404, fetches the coefficient data in coefficients buffer 450 in the first order provided.

In a different operating cycle and based on another control signal, coefficient organizing circuit 460 may generate a second mapping of the coefficient data saved in the coefficients buffer 450. For example, in the second case shown in FIG. 6B, control signal 2 directs the coefficient organizing circuit 460 to generate a second mapping of a 90-degree rotation. In response to the control signal 2, the coefficient organizing circuit 460 may generate an address order 2 that corresponds to a reading order of the memory addresses from the right column to the left column, such as $W_{02}$, $W_{12}$, $W_{22}$, $W_{01}$, ... $W_{20}$, as shown in the direction of arrows in the second case. A downstream computation circuit, such as MAC 404, fetches the coefficient data in coefficients buffer 450 in the second order provided. The second mapping represents a 90-degree rotation of the first mapping because values are read in the order from the top left corner to the bottom right corner in the first mapping while the values are read in the order from the top right corner to the bottom left corner in the second mapping.

In other operating cycles, coefficient organizing circuit 460 may generate other mappings of the coefficient data based on other control signals. For example, in the third case shown in FIG. 6C, the control signal 3 directs coefficient organizing circuit 460 to rotate the coefficient data by 180 degrees. The read order in the third case in FIG. 6C becomes the reverse of the read order 1 in the first case in FIG. 6A. Likewise, in the fourth case shown in FIG. 6D, the control signal 4 directs coefficient organizing circuit 460 to rotate the coefficient data by 270 degrees. The read order in the fourth case becomes the reverse of the read order 2 in the second case that represents the 90-degree rotation.

The mapping of coefficient data may include rotation, mirroring, scaling in values, scaling in size (e.g., turning a 3×3 set to a 5×5 set), stretching, skewing, other transformations, linear or non-linear, or a combination of two or more transformation. For example, in mirroring of the first case, the read order may be row-to-row from right to left instead of from left to right as shown in the first case. For other types of transformations such as scaling, stretching, and skewing, the mapping may include upsampling of data or downsampling of data. Mappable kernel extract 432 may include an adder and multiplier circuit that calculates the interpolation of two values for the case of upsampling.

The mapping of coefficient data reduces the size of a machine learning model and speeds up the training and inference of the model. Machine learning models often are trained to recognize input data in certain orientations. For example, in a CNN that is trained to recognize objects in images, the learned features of objects are often captured and stored in kernels. Oftentimes, the efficiency of a kernel is impacted by the particular orientation and size of the kernel relative to the input data. In forward propagation, the kernel is convolved with part of the image to determine whether the feature captured in that part of the image resembles the kernel. The convolution result between the kernel and the part of the image generates a high value when the feature captured has a similar pixel data value distribution like the kernel. However, if the feature is transformed, such as being rotated, stretched, skewed, the pixel data value distribution of the feature may no longer be similar to the kernel. As such, the convolution between a transformed feature and a kernel may not generate a high value. For example, if a kernel has a pixel value distribution that resembles a human nose, the convolution result of the kernel with a photo of a nose in the same orientation and similar size as the kernel will usually generate a high value. Yet, if the same image is rotated, the same part of the image that now captures a nose orientated sideways may not generate a high value when convolving with the kernel. Kernels and other coefficient data in machine learning models are often limited to particular orientations and sizes.

The impact of mapping or orientation of kernels and other coefficient data is particularly pronounced for machine learning models that are used in electronic devices that do not have a restricted orientation. For example, modern smartphones often allow users to take photos in any orientations, such as in portrait, in landscape, and upside down. The images captured may be in any orientation. When the images are input into a machine learning model for the model to recognize objects and features in the images, a particular kernel may only be able to capture features in one orientation but not another if some of the objects and features are turned 90 degrees or 180 degrees. To train the machine learning models, oftentimes some images in the training set are intentionally rotated, or otherwise transformed in some ways, to generate additional training images. Those transformed images result in a machine learning model learning kernels that are in different orientations (e.g., a first kernel corresponding to a nose and a second kernel corresponding to a nose turned 90 degrees). However, this type of training increases the size of the model because additional kernels that capture features in different orientations are saved.

Mappable kernel extract 432 with a coefficient organizing circuit 460 reduces the number of kernels stored in a machine learning model. In both training and runtime, the neural processor circuit 218 may use the coefficient organizing circuit 460 to rotate or transform the kernels on the fly. Hence, a kernel for one orientation may be used to capture features in other orientations. As such, the size of the machine learning model can be reduced. The training time of the model may also be reduced because the number of kernel coefficient data that needs to be adjusted in backpropagation is also reduced.

Example Circuitry of Coefficient Organizing Circuit

Figure 7:
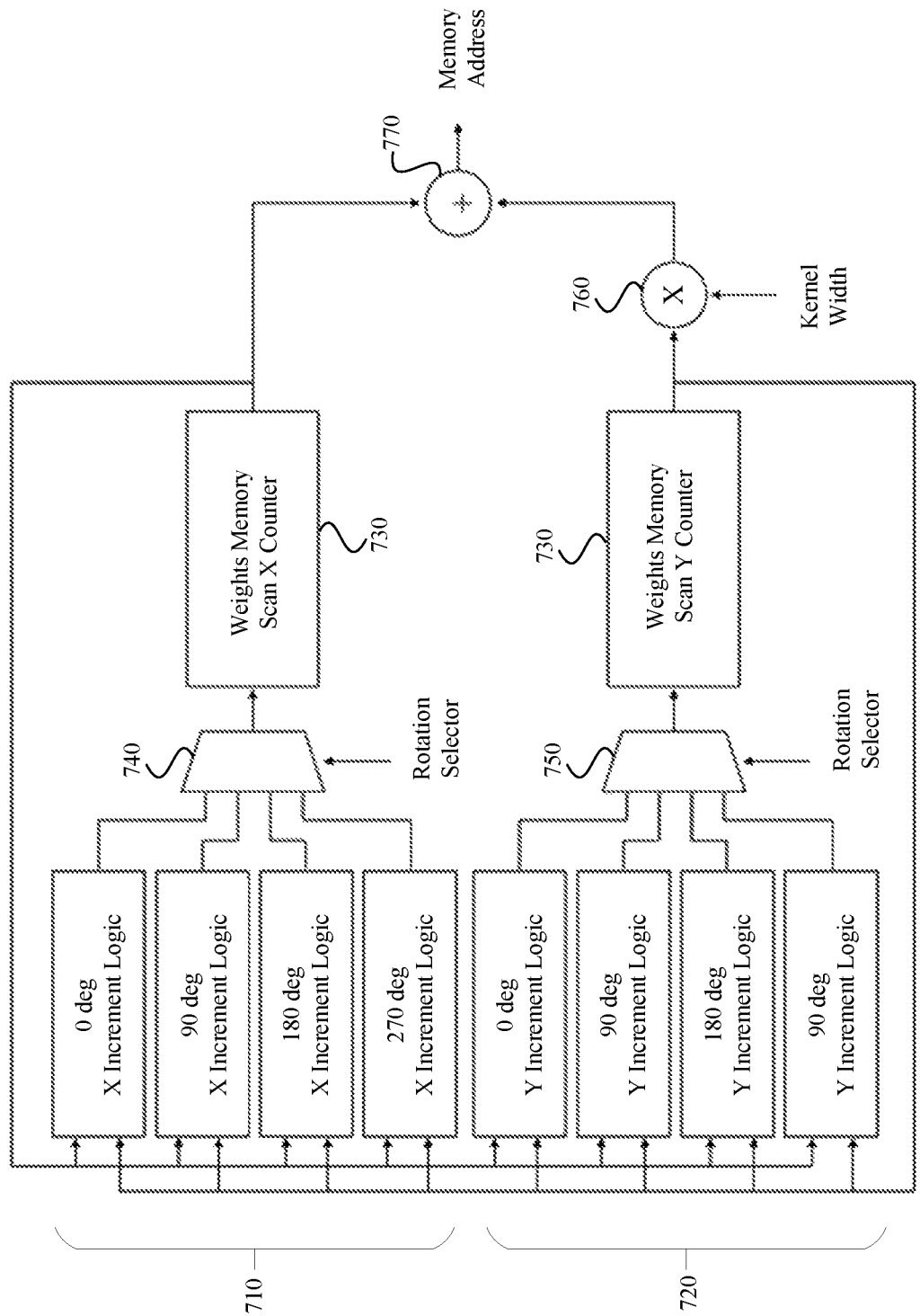
FIG. 7 is a block diagram illustrating an example circuit of a coefficient organizing circuit, according to one embodiment.

FIG. 7 is a block diagram illustrating an example circuitry of a coefficient organizing circuit 460, according to an embodiment. The circuitry shown in FIG. 7 is merely one example configuration of coefficient organizing circuit 460 for generating different read order of memory addresses. Other suitable structural arrangements and circuitry are also possible in various embodiments. For example, a similar state machine may be implemented based on the logic described in FIG. 7. Also, in coefficient organizing circuit 460 that may be used for transformations such as stretching, skewing, upsampling, one or more interpolation circuits, adders, multipliers that are not shown in FIG. 7 may also be included.

Coefficient organizing circuit 460 in FIG. 7 includes a first set 710 of increment logic circuits to generate a first digit of a memory address and a second set 720 of increment logic circuits to generate a second digit of the memory address. The first set 710 of increment logic circuits may generate the least significant digit of the memory address and the second set 720 of increment logic circuits may generate the most significant digit of the memory address, or vice versa. In embodiments that include more than two digits, a coefficient organizing circuit 460 may include one or more additional sets of increment logic circuits for generating intermediate digit(s). In the example shown in FIG. 7, the first set 710 and the second set 720 of increment logic circuits may generate a memory address that may be denoted $W_{yx}$, where x may be a first digit and y may be a second digit, similar to the notation in FIG. 6.

Each of the increment logic circuits may increment the x or y counter according to a specific rotation mode. Each of the increment logic circuits generates a new x or y counter value as a function of the current x or y counter value that is detected in the weights memory scan counter circuits 730. For example, referring to the 0-degree X increment logic circuit in FIG. 6A, the x value of the memory address (the least significant digit) goes in a cycle of 0, 1, 2, 0, 1, 2, 0, 1, 2. In another case, referring to the 180-degree X increment logic circuit in FIG. 6C, the x value of the memory address (the least significant digit) goes in a cycle of 2, 1, 0, 2, 1, 0, 2, 1, 0. Based on the current value as detected in the weights memory scan X counter, the 0-degree X increment logic circuit and the 180-degree X increment logic circuit generate different values. For example, if the current value is 1, the 0-degree X increment logic circuit will generate the value 2 while the 180-degree X increment logic circuit will generate the value 0.

The values generated by the first set 710 and the second set 720 of the increment logic circuits are selected by multiplexers 740 and 750 based on a rotation sector. The rotation sector may be part of a control signal that controls the mapping of the coefficient data or a signal generated based on the control signal. While the signal is referred to as a rotation sector, coefficient organizing circuit 460 may also perform other forms of mappings such as mirroring and other transformations. The x and y counter values are assembled to generate a memory address. For example, the y digit may be multiplied at a multiplier 760 by a size of a dimension of the coefficient data (such as kernel width). The multiplied value is added at an adder 770 to the x counter to generate the memory address. The memory address may be used by a downstream computation circuit to select the address for fetching a value at a particular operating cycle.

While the example of coefficient organizing circuit 460 shows a circuitry that uses a mode to generate a new counter value based on the current value, other logics are also possible to generate the memory address. In some embodiments, each increment logic may repeatedly generate digits based on a predetermined pattern. For example, for the 90 degree X increment logic circuit, the circuit may repeatedly generate the values of 2, 2, 2, 1, 1, 1, 0, 0, 0. In parallel, the 0 degree X increment logic circuit may repeatedly generate the value of 0, 1, 2, 0, 1, 2, 0, 1, 2. Other implementations of coefficient organizing circuit 460 are also possible.

Example Process for Rotating Kernel Data

Figure 8:
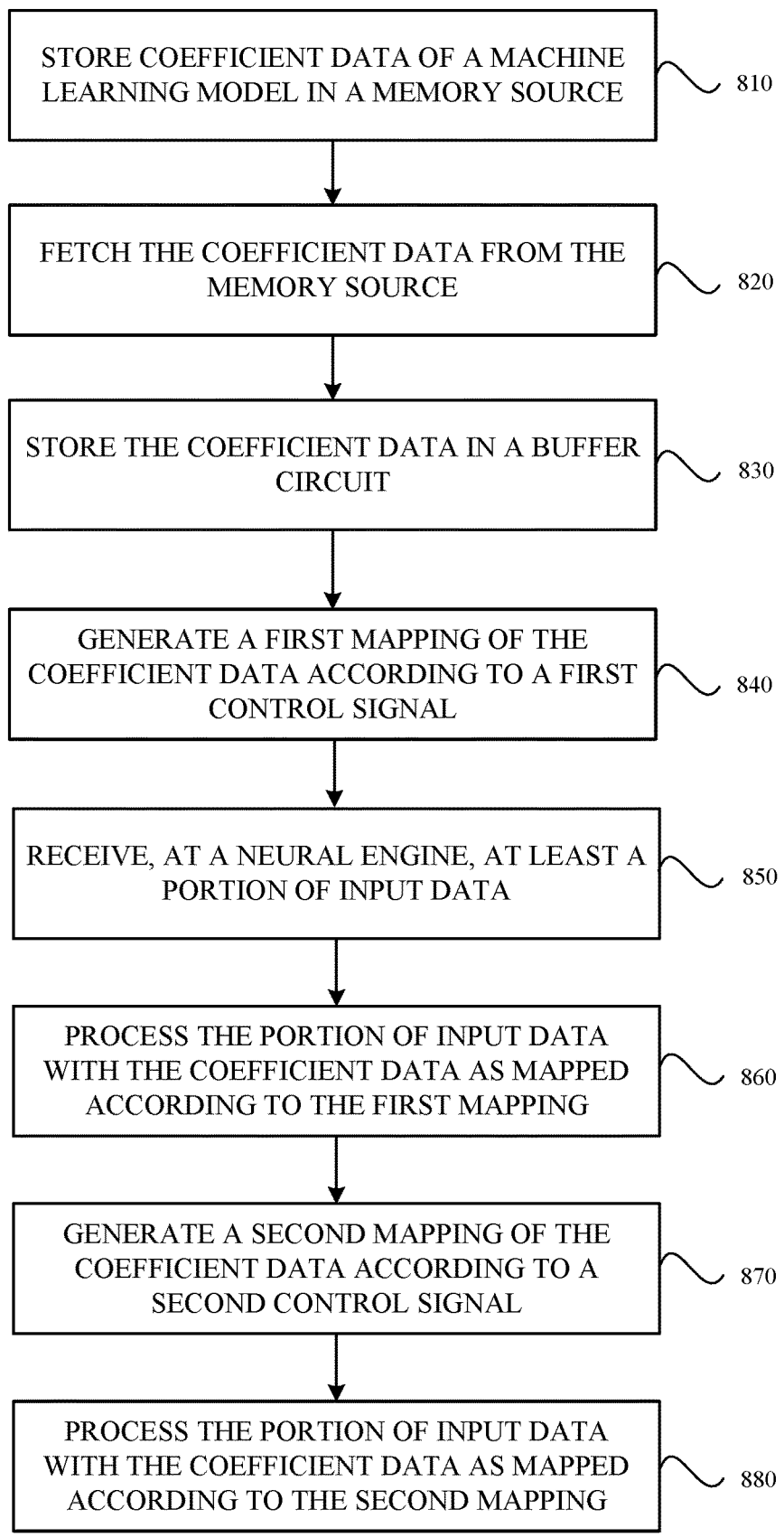
FIG. 8 is a flowchart illustrating an example process for performing neural processing operations with mappable coefficient data, according to one embodiment.

FIG. 8 is a flowchart depicting an example process for performing neural processing operations with mappable coefficient data, according to an embodiment. The neural processing operations may be part of a machine learning model process, whether operations occur in the training or runtime of the machine learning model. The neural processing operations may be performed by neural processor circuit 218 that is effective at performing various machine learning model operations and computations.

In one embodiment, device 100 stores 810 coefficient data of a machine learning model in a memory source. Coefficient data may be values in various kernels, node weights, activation functions, and other weights in the machine learning model. The memory source can be any suitable memory that can be used to store the coefficient data. Various memory locations can be used to store the coefficient data, such as system memory 230 and buffer 334 in data processor circuit 318. The coefficient data may be stored in neural processor circuits 218 (e.g., buffer 334) or outside neural processor circuit 218 (e.g., system memory 230). In some embodiments, the storage location may also depend on the operation performed by the machine learning model. For example, during training where the values of the coefficient data are frequently adjusted, the coefficient data may be stored in buffer 334. After training and the coefficient data becomes relatively fixed, the coefficient data may be stored in a non-volatile memory source such as system memory 230.

A fetch circuit in neural processor circuit 218 fetches 820 the coefficient data from the memory source. The fetch circuit may be kernel DMA 324 or any suitable fetch circuit that accesses the data values from the memory source. For example, input buffer circuit 402 or mappable kernel extract circuit 432 may also fetch the coefficient data from a memory source. The fetched coefficient data is transmitted to one or more neural engines 314. For simplicity, a single neural engine 314 is discussed, although the discussion associated with FIG. 8 may be performed by multiple neural engines 314 by having various tasks distributed among neural engines 314.

Neural processor circuit 218 stores 830 the coefficient data in a buffer circuit, such as coefficients buffer 450 of neural engine 314. The coefficient data may include a set of related values. For example, in the case of an NN such as a CNN, the coefficient data may be a kernel that represents an object feature (e.g., how an eye could look like) that is learned by the CNN. The values in the coefficient data may be saved respectively in different memory addresses of coefficients buffer 450.

Neural processor circuit 218 generates 840 a first mapping of the coefficient data according to a first control signal. For example, the first mapping may be a rotation of the coefficient data. Various mapping examples are discussed with reference to FIG. 6. The generation of the first mapping of the coefficient data may include a generation of a first order of reading the memory addresses of coefficients buffer 450, as discussed in FIG. 6. The order of reading the memory addresses may correspond to a particular mapping of the coefficient data. The first order may correspond to the first mapping. The first mapping of coefficient data may be used to detect features of a particular configuration of input data. For example, if the first mapping is a rotation of a kernel, the first mapping may be used for the machine learning model of an image that is rotated in a particular orientation. The first control signal may be transmitted from any suitable source. For example, a machine learning model may include code instruction that specifies a mapping. The code instruction may be compiled as the control signal.

Neural processor circuit 218 receives 850, at the neural engine 314, at least a portion of input data. Input data may be generated from a dataset that represents objects, images, speech, text, or any other things that the machine learning model is trying to rely upon in training or infer or analyze in runtime. For example, neural processor circuit 218 may receive an entire image or a portion of an image as the input data. The input data may also be further divided into work units because a neural engine 314 may have a certain capacity in processing data in an operating cycle.

Neural processor circuit 218 processes 860 the portion of input data with the coefficient data as mapped according to the first mapping. The portion of input data may be the entire portion of the input data or a subset of the input data. The processing of the input data and the coefficient data may be performed by a computation circuit of a neural engine 314. The computation circuit may be computation core 416, the MAD circuits, accumulator 414, MAC 404, post-processor 428, or a combination of those circuits. The precise operation of the processing may be defined by the structure of the machine learning model. For example, in a CNN, the coefficient data may be a kernel. The processing of the input data and the coefficient data may include convolving the portion of input data with the coefficient data as mapped according to the first mapping (e.g., a rotation of 90 degrees). The coefficient data that is transformed according to a mapping can be used to detect a feature based on the transformation. For example, a kernel rotated 90 degrees can be used to detect features in an image that is also rotated 90 degrees.

Neural processor circuit 218 generates 870 a second mapping of the coefficient data according to a second control signal. The second mapping may be different from the first mapping. For example, the second mapping may be the coefficient data without any change or rotation, or may be the coefficient data that is rotated in an orientation different from the first mapping. The generation of the second mapping of the coefficient data may include a generation of a second order of reading the memory addresses of coefficients buffer 450, as discussed in FIG. 6. The second order may correspond to the second mapping.

Neural processor circuit 218 processes 880 the portion of input data with the coefficient data as mapped according to the second mapping. The processing of the input data and the coefficient data as mapped according to the second mapping may be performed by a computation circuit, such as MAC 404. The processing 880 and the processing 860 may be performed by a single neural engine 314 or multiple neural engines 314. For example, in one case, a neural engine 314 may perform the processing 860 in a first operating cycle and the processing 880 in a second operating cycle. In another case, a first neural engine 314 may perform the processing 860 and a second neural engine 314 may perform the processing 880.

The use of the same coefficient data that is transformed into different mappings reduces the size of a machine learning model and speeds up the training of the model. By way of example of object recognition in images, a user may hold device 100 in different orientations to take images using image sensors 164. For simplicity of discussion, the images may be in a portrait mode or in a landscape mode, although the images may also be in other orientations. The first mapping may correspond to a first rotation of a kernel that is used to detect images in a portrait mode while the second mapping may correspond to a second rotation of the kernel that is used to detect images in a landscape mode, or vice versa. Conventionally, in order to train a machine learning model to recognize objects that are turned 90 degrees, images in a training set are often duplicated and artificially rotated or transformed in other manners so that additional kernels are learned by the machine learning model. The extra kernels that are learned occupy additional memory space, thereby increasing the size of the machine learning model. Since values of the additional kernels need to be adjusted, the training time is also increased. The process described in FIG. 8 reduces the size of the machine learning model and the training time by providing a circuit to transform the coefficient data. Therefore, fewer kernels are learned during the training of the machine learning model.

Example Process for Operating a Machine Learning Model

Figure 9A:
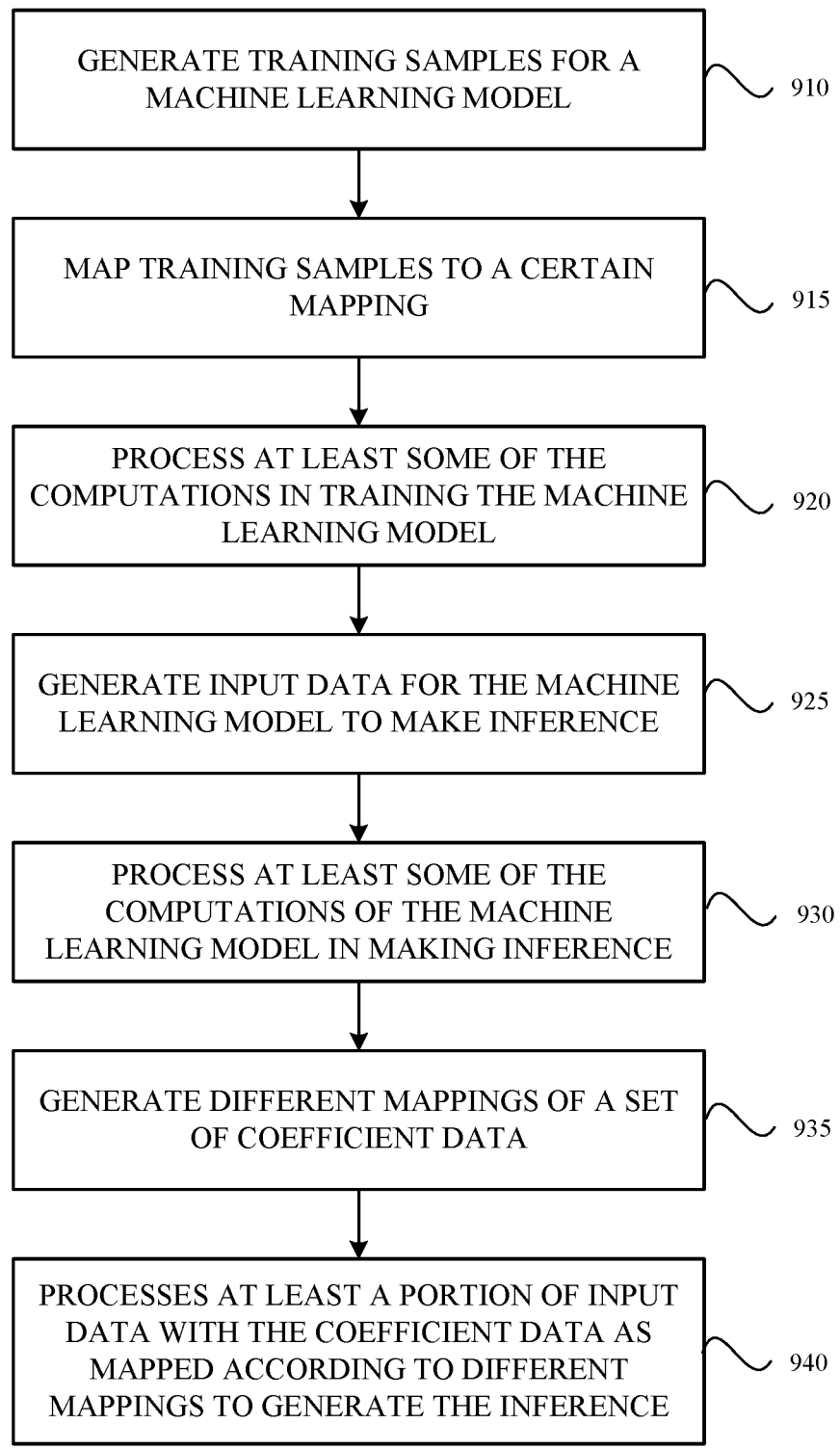
FIGS. 9A and 9B are flowcharts illustrating example processes for operating a machine learning model, according to some embodiments.
Figure 9B:
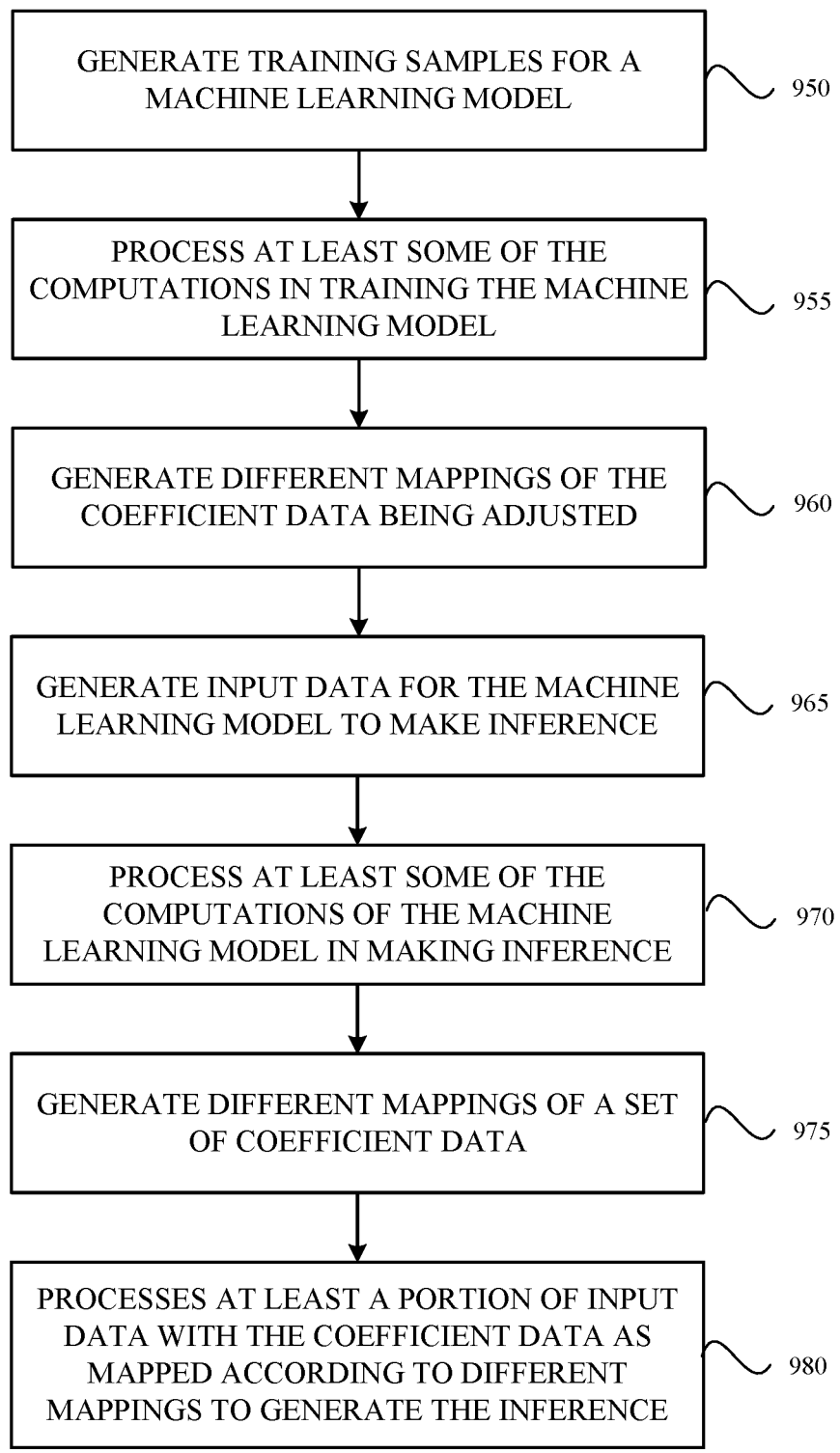

FIGS. 9A and 9B are flowcharts depicting example processes for operating a machine learning model, according to some embodiments. The operation of a machine learning model in one or more devices 100 may include training of the model and using the model to make inferences. The operation may be performed using neural processor circuit 218 in cooperation with other processors such as CPU 208, GPU 220, and ISP 206. In some cases, the operation may also be performed in more than one device 100. For example, training may be performed by one device 100 to generate a fully trained or partially trained model. Another device 100 may download the model to perform inference and additional training.

A training set that includes multiple training samples is used to train a machine learning model. For example, for object recognition in images, training samples may be images that are associated with labels that identify the objects included in the images. For speech recognition, the training samples may be speech samples with known contents. Other training samples are also suitable, depending on the context of the machine learning model. Various suitable ways may be used to generate the training samples. In one case, the training samples may be generated under one or more constraints. For example, for images, a person may manually rotate the images so that the objects in the training samples have the same orientation. In another case, the training samples may be generated without such constraints. For example, the training samples may include images of different orientations.

FIG. 9A illustrates an example process of operating a machine learning model, according to an embodiment. The process may include training the model with training samples that are generated with a certain condition, such as aligning the orientation of images in the training samples. The training samples are generated 910. The training samples are mapped 915 to a certain mapping, such as a particular orientation of rotation in the case of images. A device 100 uses neural processor circuit 218 to process 920 at least some of the computations in training the machine learning model, such as convolving the coefficient data being adjusted with at least portions of the training samples. Since the training samples are generated with the condition, the values of coefficient data learned may be limited to a certain mapping (e.g., the kernels learned may be in the same rotation orientation). This reduces the size of the trained machine learning model because fewer coefficient data (e.g., fewer kernels) need to be learned and stored.

After the machine learning model is trained, a device 100 generates 925 input data for the machine learning model to make inferences. For example, multiple images may be captured by image sensors 164. The images may be captured in different orientations. The device 100 uses neural processor circuit 218 to process 930 at least some of the computations of the machine learning model in making inferences. For example, neural processor circuit 218 generates 935 different mappings of a set of coefficient data that are, for example, used to detect object features in different image orientations. Neural processor circuit 218 processes 940 at least a portion of input data with the coefficient data as mapped according to different mappings to generate the inference. For example, the objects in an image captured by an image sensor 164 may be in an unknown orientation. Neural processor circuit 218 rotates a kernel to different orientation to detect any potential target feature in one of the orientations.

FIG. 9B illustrates another example process of operating a machine learning model, according to an embodiment. The process may include training the model with training samples that may include different configurations. The training samples are generated 950. For example, for a model that performs object recognition in images, the images in the training samples may be in different orientations. In this example, the training samples may not need to be configured to a certain mapping. This could reduce the cost of generating the training samples because rotating training images to a certain orientation could be a labor-intensive task. A device 100 uses neural processor circuit 218 to process 955 at least some of the computations in training the machine learning model, such as convolving the coefficient data being learned with at least portions of the training samples. In training the model, neural processor circuit 218 generates 960 different mappings of the coefficient data being adjusted. For example, kernels are rotated in training to capture features that are positioned in different orientations. The mapping of the coefficient data in training also reduces the size of the trained machine learning model because a set of coefficient data may be used to capture features in different mappings.

After the machine learning model is trained, a device 100 generates 965 input data for the machine learning model to make inferences. For example, multiple images may be captured by image sensors 164. The images may be captured in different orientations. The device 100 uses neural processor circuit 218 to process 970 at least some of the computations of the machine learning model in making the inferences. For example, neural processor circuit 218 generates 975 different mappings of a set of coefficient data that are used to, for example, detect object features in different image orientations. Neural processor circuit 218 processes 980 at least a portion of input data with the coefficient data as mapped according to different mappings to generate the inference. For example, the objects an image captured by an image sensor 164 may be in an unknown orientation. Neural processor circuit 218 rotates a kernel to different orientation to detect any potential target feature in one of the orientations.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
a fetch circuit configured to fetch coefficient data of a machine learning model from a memory source, wherein the coefficient data comprises a plurality of coefficients; and
one or more neural engine circuits coupled to the fetch circuit, at least one of the neural engine circuits comprising:
a buffer circuit configured to receive the coefficient data from the fetch circuit and store the coefficient data;
a coefficient organizing circuit configured to generate at least a first mapping and a second mapping of the coefficient data according to one or more control signals, wherein the first mapping is indicative of a first reading order and the second mapping is indicative of a second reading order, each coefficient of the plurality of coefficients read from the buffer circuit, and wherein the first reading order is different than the second reading order; and
a computation circuit configured to receive and process at least a portion of input data with the coefficient data as mapped according to the first mapping or process at least the portion of the input data with the coefficient data as mapped according to the second mapping.

2. The neural processor circuit of claim 1, wherein the buffer circuit comprises a plurality of memory addresses, and wherein the coefficient data is stored at the plurality of memory addresses.

3. The neural processor circuit of claim 1, wherein the computation circuit is further configured to read the coefficient data according to the first reading order in response to receiving a first control signal or the second reading order in response to receiving a second control signal.

4. The neural processor circuit of claim 1, wherein the coefficient data corresponds to a kernel used in a neural network.

5. The neural processor circuit of claim 4, wherein the coefficient organizing circuit is configured to rotate the kernel, the first mapping corresponds to a first rotation of the kernel, and the second mapping corresponds to a second rotation of the kernel.

6. The neural processor circuit of claim 1, wherein the coefficient organizing circuit is configured to generate the first mapping in a first operating cycle of the neural processor circuit and generate the second mapping in a second operating cycle of the neural processor circuit.

7. The neural processor circuit of claim 1, wherein the neural engine circuits are configured to process a same portion of the input data with the coefficient data mapped according to the first mapping and with the coefficient data mapped according to the second mapping to generate two different outputs.

8. The neural processor circuit of claim 1, wherein the first mapping and the second mapping are selected from one or more of rotation, mirroring, scaling, stretching, and skewing.

9. The neural processor circuit of claim 1, wherein the computation circuit comprises a multiply-add circuit.

10. A method for performing neural processing operations, comprising:
fetching coefficient data of a machine learning model to a neural engine circuit from a memory source, wherein the coefficient data comprises a plurality of coefficients;
storing the coefficient data in a buffer circuit of the neural engine circuit;

generating a first mapping of the coefficient data according to a first control signal, wherein the first mapping is indicative of a first reading order in which each coefficient of the plurality of coefficients are read from the buffer circuit;

receiving, at the neural engine circuit, at least a portion of input data;

processing the portion of input data with the coefficient data as mapped according to the first mapping;

generating a second mapping of the coefficient data according to a second control signal, wherein the second mapping is indicative of a second reading order, each coefficient of the plurality of coefficients read from the buffer circuit, and wherein the first reading order is different than the second reading order; and processing the portion of input data with the coefficient data as mapped according to the second mapping.

11. The method of claim 10, wherein storing the coefficient data in the buffer circuit comprises storing the coefficient data at a plurality of memory addresses of the buffer circuit.

12. The method of claim 10, wherein the coefficient data corresponds to a kernel used in a neural network.

13. The method of claim 12, wherein generating the first mapping of the coefficient data comprises rotating the kernel to a first rotation orientation and generating the second mapping of the coefficient data comprises rotating the kernel to a second rotation orientation.

14. The method of claim 10, wherein processing the portion of input data with the coefficient data as mapped according to the first mapping comprises convolving the portion of input data with the coefficient data as mapped according to the first mapping, and processing the portion of input data with the coefficient data as mapped according to the second mapping comprises convolving the portion of input data with the coefficient data as mapped according to the second mapping.

15. An electronic device, comprising:
an image sensor configured to capture images;
a memory configured to store a machine learning model, the machine learning model comprising coefficient data corresponding to detecting features in the images, wherein the coefficient data comprises a plurality of coefficients; and
a neural engine circuit coupled to the memory, the neural engine circuit comprising:
a buffer circuit configured to store the coefficient data fetched from the memory;
a coefficient organizing circuit configured to generate at least a first mapping and a second mapping of the coefficient data according to one or more control signals, wherein the first mapping is indicative of a first reading order and the second mapping is indicative of a second reading order, each coefficient of the plurality of coefficients read from the buffer circuit, and wherein the first reading order is different than the second reading order; and
a computation circuit configured to receive and process at least a portion of input data with the coefficient data as mapped according to the first mapping or process at least the portion of the input data with the coefficient data as mapped according to the second mapping, the input data corresponding to one of the images captured by the image sensor.

16. The electronic device of claim 15, wherein the image sensor is configured to operate in multiple modes, the first mapping corresponds to a first transformation in a first mode, and the second mapping corresponds to a second transformation in a second mode.

17. The electronic device of claim 16, wherein the multiple modes comprise a portrait mode and a landscape mode, the first mapping corresponds to a first rotation, and the second mapping corresponds to a second rotation.

18. The electronic device of claim 15, wherein the machine learning model is a neural network and the coefficient data corresponds to a kernel.

19. The electronic device of claim 18, wherein, to generate the first mapping, the coefficient organizing circuit is configured to rotate the kernel to a first rotation orientation and, to generate the second mapping, the coefficient organizing circuit is configured to rotate the kernel to a second rotation orientation.

20. The electronic device of claim 15, wherein the neural engine circuit is configured to process a same portion of the input data with the coefficient data mapped according to the first mapping and with the coefficient data mapped according to the second mapping to generate two different outputs.

* * * * *